United States Patent
Harden et al.

(10) Patent No.: US 9,767,008 B2
(45) Date of Patent: *Sep. 19, 2017

(54) AUTOMATIC TEST CASE GENERATION

(71) Applicant: International Business Machines Corporation, Armonk, NY (US)

(72) Inventors: Arron J. Harden, Olney (GB); Wendi L. Nusbickel, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,835

(22) Filed: Mar. 10, 2015

(65) Prior Publication Data
US 2015/0254171 A1    Sep. 10, 2015

Related U.S. Application Data

(63) Continuation of application No. 14/197,971, filed on Mar. 5, 2014.

(51) Int. Cl.
G06F 11/36 (2006.01)
G06F 17/30 (2006.01)
G06F 9/44 (2006.01)

(52) U.S. Cl.
CPC .... G06F 11/3684 (2013.01); G06F 17/30563 (2013.01)

(58) Field of Classification Search
CPC .................................. G06F 11/3684
USPC ....................................... 717/124
See application file for complete search history.

(56) References Cited

U.S. PATENT DOCUMENTS

| 7,028,223 | B1* | 4/2006 | Kolawa ............... G06F 11/3688 714/37 |
| 2005/0086565 | A1* | 4/2005 | Thompson .......... G06F 17/5022 714/741 |
| 2005/0278270 | A1* | 12/2005 | Carr et al. ....................... 706/25 |
| 2006/0026168 | A1* | 2/2006 | Bosworth et al. .............. 707/10 |

(Continued)

FOREIGN PATENT DOCUMENTS

CN         102368217          3/2012

OTHER PUBLICATIONS

Hadley, Marc J., "Web Application Description Language (WADL)", Sun Microsystems Inc., Nov. 9, 2006, 31pg.*

(Continued)

Primary Examiner — Ryan Coyer
(74) Attorney, Agent, or Firm — Susan Murray; Edell, Shapiro & Finnan, LLC

(57) ABSTRACT

According to an embodiment of the present invention, a system for generating one or more test cases for a service of a server system comprises at least one processor. The system analyzes metadata associated with the service to generate a schema definition for inputs and outputs of the service. A description of the service is generated in an application description language that refers to the schema definition. The system processes the generated description of the service to produce the one or more test cases. Embodiments of the present invention further include a method and computer program product for generating one or more test cases for a service in substantially the same manner described above.

6 Claims, 9 Drawing Sheets

(56) References Cited

U.S. PATENT DOCUMENTS

| | | | | |
|---|---|---|---|---|
| 2006/0101397 | A1* | 5/2006 | Mercer et al. | 717/120 |
| 2006/0173892 | A1* | 8/2006 | Beck | H04L 69/18 |
| 2006/0253588 | A1* | 11/2006 | Gao | G06F 11/3688 709/226 |
| 2008/0082968 | A1* | 4/2008 | Chang | G06F 11/3688 717/128 |
| 2008/0126389 | A1* | 5/2008 | Mush et al. | 707/102 |
| 2009/0006897 | A1* | 1/2009 | Sarsfield | G06F 11/3684 714/38.14 |
| 2010/0011345 | A1* | 1/2010 | Hickerson | G06F 11/3632 717/130 |
| 2010/0100871 | A1* | 4/2010 | Celeskey | G06F 11/3688 717/124 |
| 2012/0030657 | A1* | 2/2012 | Gao | G06F 9/524 717/128 |
| 2012/0150820 | A1* | 6/2012 | Sankaranarayanan | G06F 17/30303 707/690 |
| 2012/0246213 | A1* | 9/2012 | Ma et al. | 709/201 |
| 2013/0179769 | A1* | 7/2013 | Gurfinkel et al. | 715/234 |
| 2014/0068047 | A1* | 3/2014 | Williams et al. | 709/223 |
| 2015/0020049 | A1 | 1/2015 | Caufield et al. | |
| 2015/0254166 | A1 | 9/2015 | Harden et al. | |
| 2015/0347261 | A1 | 12/2015 | Li et al. | |

OTHER PUBLICATIONS

Bai et al., "WSDL-Based Automatic Test Case Generation for Web Services Testing", IEEE, 2005, 6pg.*

Bozkurt et al., "Testing Web Services: A Survey", King's College London, 2010, 49pg.*

Nebut et al., "Automatic Test Generation: A Use Case Driven Approach", IEEE, 2006, 16pg.*

Hadley, "Mapping WADL to Java", http://weblogs.java.net/blog/mhadley/archive/2006/05/mapping_wadl_to.html, Java.net, May 25, 2006, 3 pages.

"Wadl2java Tool Documentation", http://wadl.java.net/wadl2java.html, accessed Feb. 2014, 4 pages.

Nurkiewicz, "Gentle introduction to WADL (in JAVA)", http://java.dzone.com/articles/gentle-introduction-wadl-java, DZone, Jan. 31, 2012, 5 pages.

"Apache Wink: JAX-RS Getting Started", Java API for RESTful Web Services, http://incubator.apache.org/wink/1.0/html/JAX-RS%20Getting%20Started.html, Oct. 13, 2009, 3 pages.

Russell et al., "D.O.H.: Dojo Objective Harness", http://dojotoolkit.org/reference-guide/1.8/util/doh.html, The Dojo Toolkit—Reference Guide, accessed Feb. 2014, 7 pages.

"DOH Robot", http://dojotoolkit.org/reference-guide/1.8/util/dohrobot.html, The Dojo Toolkit—Reference Guide, accessed Feb. 2014, 10 pages.

Selinium HQ, "Selenium—Web Browser Automation", http://docs.seleniumhq.org/, accessed Feb. 2014, 2 pages.

IBM, "Rational Functional Tester", http://www-01.ibm.com/software/awdtools/tester/functional/, accessed Feb. 2014.

"Httest", http://htt.sourceforge.net/cgi-bin/cwiki/bin/public, Sourceforge.net, HTTP Test Tool, accessed Feb. 2014, 3 pages.

IBM, "Test Framework for Computing Jobs", U.S. Appl. No. 13/937,602, filed Jul. 9, 2013, 25 pages.

U.S. Appl. No. 14/291,421, filed May 30, 2014, "A Performance Checking Component for an ETL Job", 33 pages.

* cited by examiner

```
<application xmlns="http://wadl.dev.java.net/2009/02">
  <grammars>
    <include href="customerSearch.xsd"/>  ←——— 510
  </grammars>

<resources base="http://infosrv.com/ibm/iis/isd">
    <resource path="customers">
      <method name="GET">
        <doc title="Searches the customer database"/>
        <request>                                                          ←——— 520
          <param name="firstNameToFind" style="query" type="firstNameToFindType"/>
          <param name="lastNameToFind" style="query" type="lastNameToFindType"/>
          <param name="ageToFind" style="query" type="ageToFindType"/>
          <param name="maxNumberOfResults" style="query" type="maxNumberOfResultsType"/>
        </request>
        <response>
          <representation mediaType="application/xml;charset=utf-8" element="customerSearch_OutputType"/>
        </response>
      </method>
    </resource>
  </resources>
</application>
```

String type exceeds max length
```
public void test1() throws Exception {
    RESTClient client = new RESTClient("http://infosrv.com");
    RESTRequest req = new RESTRequest(RESTHttpMethod.GET, "/ibm/iis/isd/customers", RESTHttpMediaType.XML_UTF8);
    req.setParam("firstNameToFind", "abcdefghijabcdefghijabcdefghij");  // maxLength should be <= 30
    req.setParam("lastNameToFind", "a");
    req.setParam("ageToFind", "18");
    RESTResponse resp = client.sendRequest(req);
    assertTrue(200 != resp.getStatus(), "Request was expected to fail: firstNameToFind value length exceeded type specification of 30");
}
```
↙ 610    ↗ 615

Numeric type out of range
```
public void test2() throws Exception {
    RESTClient client = new RESTClient("http://infosrv.com");
    RESTRequest req = new RESTRequest(RESTHttpMethod.GET, "/ibm/iis/isd/customers", RESTHttpMediaType.XML_UTF8);
    req.setParam("firstNameToFind", "a");
    req.setParam("lastNameToFind", "a");
    req.setParam("ageToFind", "-1");  // minValue should be 18
    RESTResponse resp = client.sendRequest(req);
    assertTrue(200 != resp.getStatus(), "Request was expected to fail: ageToFind value was less than the minimum in the type specification of 18");
}
```
↙ 620    ↗ 625

Missing required parameter
```
public void test3() throws Exception {
    RESTClient client = new RESTClient("http://infosrv.com");
    RESTRequest req = new RESTRequest(RESTHttpMethod.GET, "/ibm/iis/isd/customers", RESTHttpMediaType.XML_UTF8);
    req.setParam("firstNameToFind", "a");       ⎫ 635
    req.setParam("lastNameToFind", "a");         ⎭
    RESTResponse resp = client.sendRequest(req);
    assertTrue(200 != resp.getStatus(), "Request was expected to fail: ageToFind parameter was not specified");
}
```
↙ 630

FIG. 6

Successful (user required to modify test case and supply correct inputs)
before:

```
public void test4() throws Exception {
    RESTClient client = new RESTClient("http://infosrv.com");
    RESTRequest req = new RESTRequest(RESTHttpMethod.GET, "/ibm/iis/isd/customers", RESTHttpMediaType.XML_UTF8);
    req.setParam("firstNameToFind", "<TODO>");    // TODO: provide correct input
    req.setParam("lastNameToFind", "<TODO>");     // TODO: provide correct input
    req.setParam("ageToFind", "<TODO>");          // TODO: provide correct input
    RESTResponse resp = client.sendRequest(req);
    assertEqual(200, resp.getStatus(), "Request was expected to succeed");
}
```
↖ 710 after:

```
public void test4() throws Exception {
    RESTClient client = new RESTClient("http://infosrv.com");
    RESTRequest req = new RESTRequest(RESTHttpMethod.GET, "/ibm/iis/isd/customers", RESTHttpMediaType.XML_UTF8);
    req.setParam("firstNameToFind", "john");
    req.setParam("lastNameToFind", "smith");
    req.setParam("ageToFind", "27");
    RESTResponse resp = client.sendRequest(req);
    assertEqual(200, resp.getStatus(), "Request was expected to succeed");
}
```
↖ 720

FIG.7

AUTOMATIC TEST CASE GENERATION

CROSS-REFERENCE TO RELATED APPLICATIONS

This application is a continuation of U.S. patent application Ser. No. 14/197,971, entitled "AUTOMATIC TEST CASE GENERATION" and filed Mar. 5, 2014, the disclosure of which is incorporated herein by reference in its entirety.

BACKGROUND

1. Technical Field

Present invention embodiments relate to testing of software on computer systems, and more specifically, to automatically generating executable test cases for extract, transform, load (ETL) or other jobs implemented as a service of a server or other system.

2. Discussion of the Related Art

Ensuring quality of software is a challenging task. In addition to producing software with good design and programming practices, software needs to be tested to ensure quality. The earlier that errors (or bugs) are identified in the software development process, the less costly the errors are to fix. Accordingly, testing should occur as the software is developed, where a test suite may be employed to identify any regressions that may have occurred due to changes in the software.

Typically, software components depend on other software components for proper operation, such as in a client-server environment. In this case, a dependent software component may be inoperable due to a change in the parent software component from which the dependent software component relies. Software that provides a server-side service must have a higher quality standard since many client components are dependent on this software to function correctly. A common type of server-side service is a Hypertext Transfer Protocol (HTTP) service, specifically, one that uses a Representational State Transfer (REST) design paradigm. This type of service is typically implemented in Java, using a Java API for REST Web Services, commonly referred to as "JAX-RS".

When development resources are limited, time to produce test cases and enable automation is scarce. Since development schedule pressures usually focus on core code functional completion, producing test code is often deferred until the end of the development cycle (if even performed). In addition, a client component that is dependent on a server-side component, such as a web user interface application, typically fails to cover testing of server interfaces, and often becomes inoperable when a server interface (or data provided by that interface) changes. For example, when a client component, such as a web user interface application, becomes inoperable due to a server-side change, determining the cause of the error can be misleading, costly, and error prone. A client component often has no control over the server-side component, which could be owned by another company or reside in a public domain.

Typically, testing in these scenarios may be obviated (no test case creation) or performed by manual tests built by sniffing HTTP traffic, JUnit development (a unit testing framework for Java) of Java Classes for testing, or using a graphical user interface (GUI) to find server-side issues. However, these testing approaches are manual and often do not test the correct component, such as the server system in a client-server environment.

BRIEF SUMMARY

According to an embodiment of the present invention, a system for generating one or more test cases for a service of a server system comprises at least one processor. The system analyzes metadata associated with the service to generate a schema definition for inputs and outputs of the service. A description of the service is generated in an application description language that refers to the schema definition. The system processes the generated description of the service to produce the one or more test cases. Embodiments of the present invention further include a method and computer program product for generating one or more test cases for a service in substantially the same manner described above.

BRIEF DESCRIPTION OF THE SEVERAL VIEWS OF THE DRAWINGS

Generally, like reference numerals in the various figures are utilized to designate like components.

FIG. 5 is an illustration of an example application description generated from ETL job metadata, a service input schema, and a service output schema according to an embodiment of the present invention.

FIG. 6 is an illustration of example test cases generated according to an embodiment of the present invention.

FIG. 7 is an illustration of an example test case that receives user specified data for testing according to an embodiment of the present invention.

DETAILED DESCRIPTION

When a client component, such as a web user interface application, becomes inoperable due to a server-side change, determining the cause of the error can be misleading, costly, and error prone. A client component often has no control over the server-side component, which could be owned by another company or reside in a public domain. By way of example, extract, transform, load (ETL) jobs can be configured to behave as a server-side service which are always available to respond to client initiated requests (typically via HTTP/REST). An ETL application generally refers to a software product (e.g., IBM Information Server, etc.) that is utilized to design and create one or more ETL jobs (e.g., to suit particular business or other needs). When deployed in this configuration as a server-side service, it becomes difficult to test an ETL job end-to-end. Although an ETL application of the ETL job may allow some degree of unit testing for logic within the ETL job, the ETL application does not allow testing to extend beyond the boundaries of the ETL job. In particular, the ETL application does not allow testing at the service level that binds the ETL job to a particular service, such as HTTP/REST.

Testing at the service level includes components normally excluded by testing at the ETL job level, such as the service binding (i.e., translating the service request inputs into the ETL job inputs and translating the ETL job outputs back into the service response). The service level testing allows a degree of abstraction between the service inputs/outputs and the actual ETL job implementation, thereby enabling the ETL job to be re-implemented as required without impacting the service based tests.

Present invention embodiments pertain to automatically generating one or more test cases from an extract, transform, load (ETL) or other job to test that job, where the ETL or other job has been configured to behave as a server-side service. Initially, a Web Application Descriptor Language (WADL) description of the service is generated. WADL is an Extended Markup Language (XML) description of HTTP-based web applications (e.g., Representational State Transfer (REST)). The WADL description is converted into a test case, such as a JUnit application (e.g., for a unit testing framework for Java). Since WADL is a self-documenting feature of REST resources and implemented using Java JAX-RS libraries, the test case generation can apply to any JAX-RS service.

In addition, present invention embodiments may automatically generate a regression test against a server system (and corresponding service) that is used by a client component, but owned and/or provided by a third party. This helps prevent client components from becoming inoperable by identifying changes in a server interface that can impact the client components.

Figure 1:
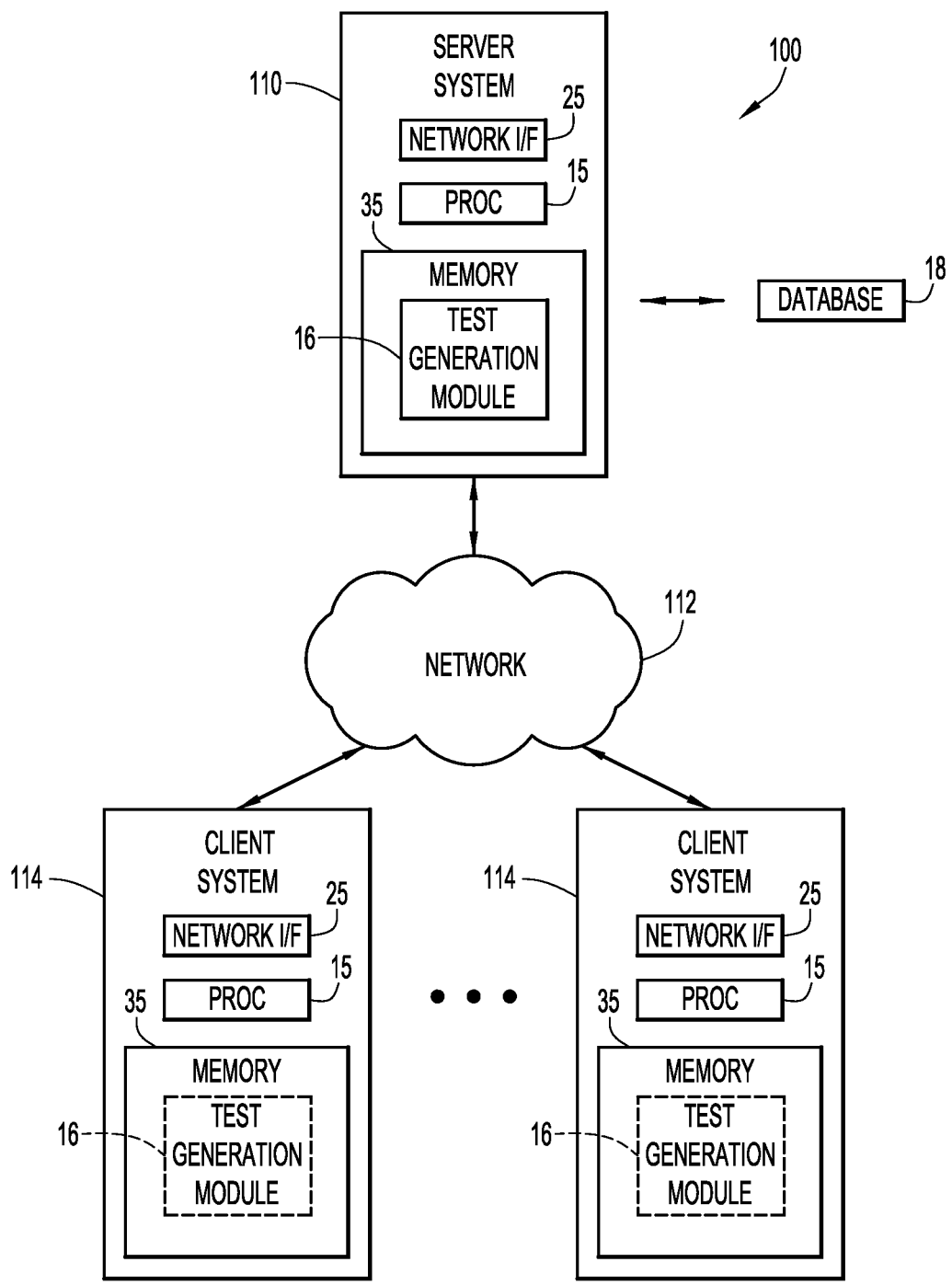
FIG. 1 is a diagrammatic illustration of an example computing environment for use with an embodiment of the present invention.

An example environment for use with present invention embodiments is illustrated in FIG. 1. Specifically, an environment 100 includes one or more server systems 110, and one or more client or end-user systems 114. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 enable users to provide information pertaining to extract, transform, load (ETL) or other jobs for which test case generation is desired to server systems 110 to automatically generate executable test cases for those jobs. The server systems include a test generation module 16 to generate the executable test cases. A database system 18 may store various information for the test case generation (e.g., schemas, application description, templates, generated test cases, etc.). The database system may be implemented by any conventional or other database or storage unit, may be local to or remote from server systems 110 and client systems 114, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired jobs (e.g., resulting test case formats, etc.), and may provide reports including results (e.g., generated test cases, jobs, etc.).

Server systems 110 and client systems 114 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, test generation module, browser/interface software, etc.).

Alternatively, one or more client systems 114 may generate test cases for extract, transform, load (ETL) or other jobs on server systems 110 (which may be owned and/or provided by an outside or third party). In this mode of operation, the client system stores or has access to job information and includes test generation module 16 to generate the test cases. The graphical user (e.g., GUI, etc.) or other interface (e.g., command line prompts, menu screens, etc.) solicits information from a corresponding user pertaining to the desired jobs (e.g., resulting test case formats, etc.), and may provide reports including results (e.g., generated test cases, jobs, etc.).

Test generation module 16 may include one or more modules or units to perform the various functions of present invention embodiments described below. The various modules (e.g. test generation module, etc.) may be implemented by any combination of any quantity of software and/or hardware modules or units, and may reside within memory 35 of the server and/or client systems for execution by processor 15.

Figure 2:
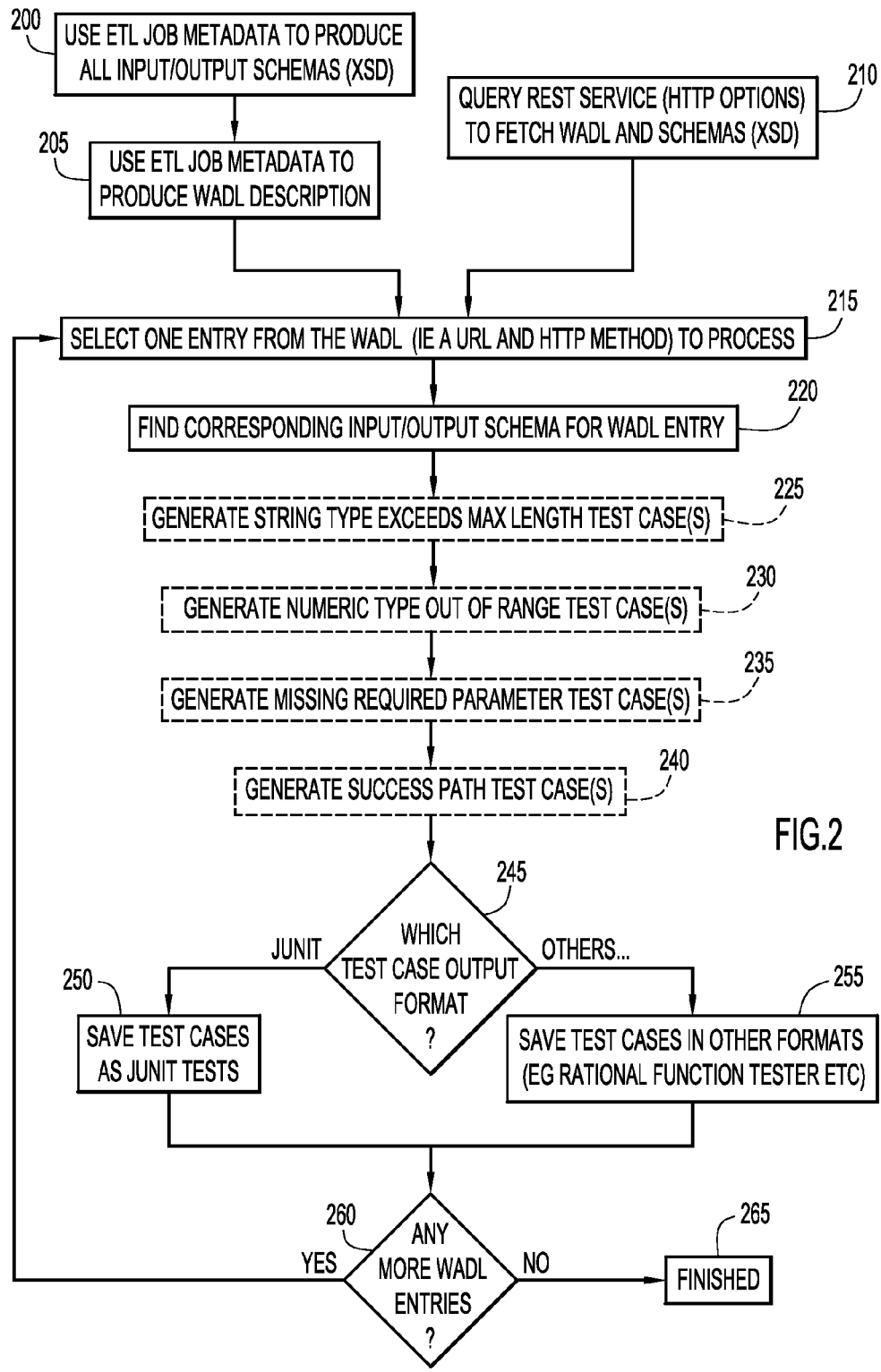
FIG. 2 is a procedural flowchart illustrating a manner of automatically generating executable test cases according to an embodiment of the present invention.

A manner of automatically generating one or more test cases (e.g., via test generation module 16 and a server system 110 and/or a client system 114) for an extract, transform, load (ETL) or other job configured as a service of a server system is illustrated in FIG. 2. The test generation module may be initiated from a job design tool to generate the test cases. By way of example, the test case generation is described with respect to an extract, transform, load (ETL) job. However, present invention embodiments may be applied to generate test cases for any suitably configured service of a server or other system (e.g., HTTP/REST job, etc.) in substantially the same manner described below.

Initially, the test case generation may be performed for an internal service (e.g., a client component and service are owned and/or provided by a common party), or for an external service provided by an outside or third party (e.g., a client component and service are owned and/or provided by different parties). In the case of an internal service, metadata pertaining to an extract, transform, load (ETL) job (e.g., including input and output schemas 320, 420 (FIGS. 3A and 4A), etc.) configured as an internal service of a server system is retrieved at step 200 and used to generate schemas for the input and output of the service. An ETL job is designed with inputs (if any) and outputs (if any) of the service being mapped to ETL artifacts. In particular, the inputs (if any) to the service are mapped to zero or more input stages and zero or more job wide parameters (e.g., the inputs pertain to job characteristics, such as a number of results to provide), while the outputs from the service (if any) are mapped to zero or more output stages. Further, the ETL job has input and output schemas (e.g., schemas 320, 420 of FIGS. 3A and 4A) which are automatically saved in the ETL job metadata in a proprietary format by an ETL application creating the job.

A schema (e.g., XML schema definition (XSD)) for the service inputs and outputs may be automatically deduced based on information including the above mappings, the metadata of the ETL job (e.g., including the input and output schemas), and profiled schema information associated with the ETL job. An XSD is an XML-based language or grammar used to describe and control XML document contents. The deduced schemas may include various restrictions for the service inputs and outputs, such as minimum and maximum numerical values, whether the service inputs and outputs are optional or required, minimum and maximum string lengths, and string formats. These restrictions enable detailed test cases to be produced as described below. The resulting schemas for the inputs and outputs of the service are preferably stored in a file for further utilization as described below.

Figure 3A:
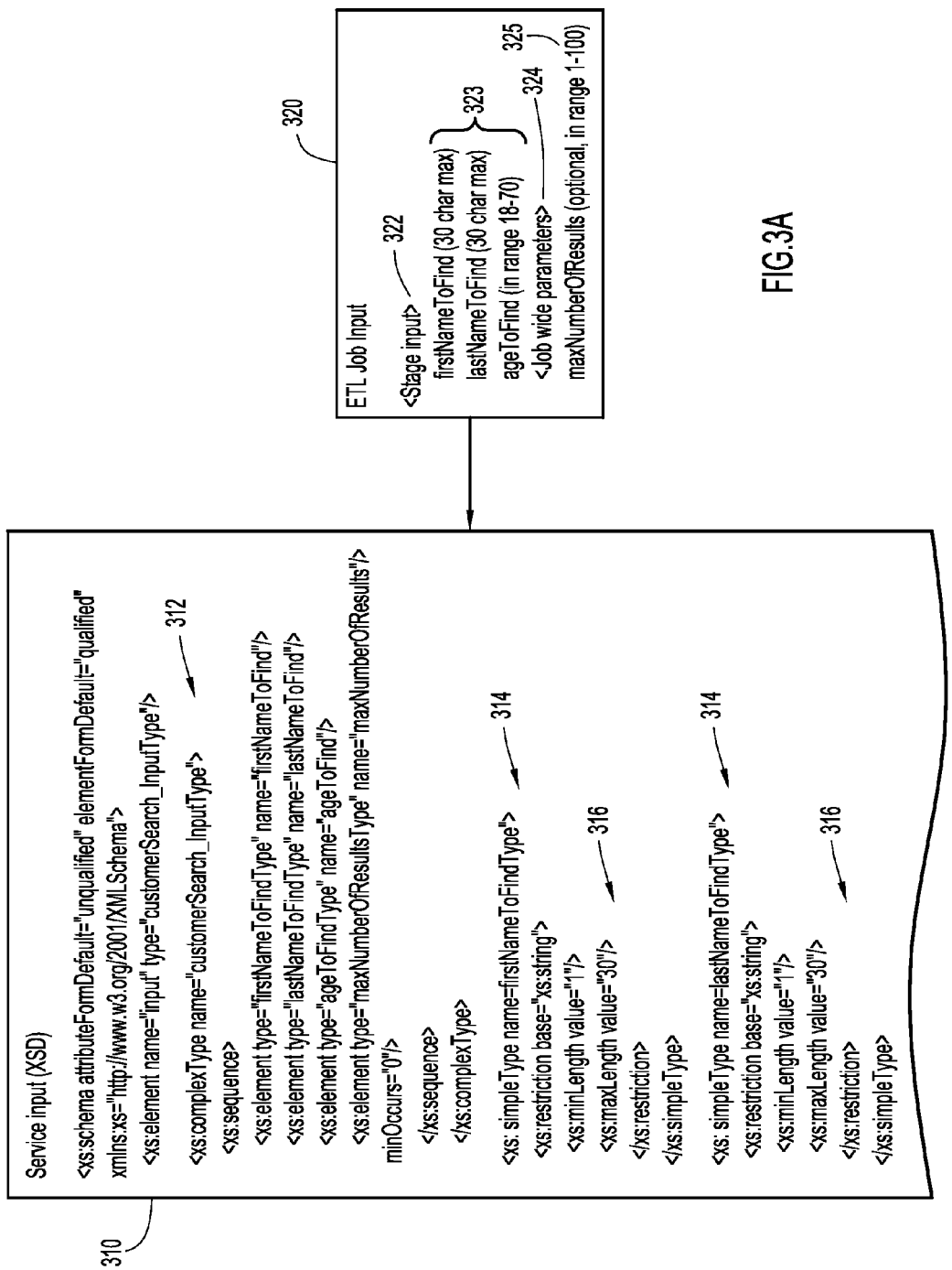
FIGS. 3A-3B are an illustration of an example service input schema generated according to an embodiment of the present invention.
Figure 3B:
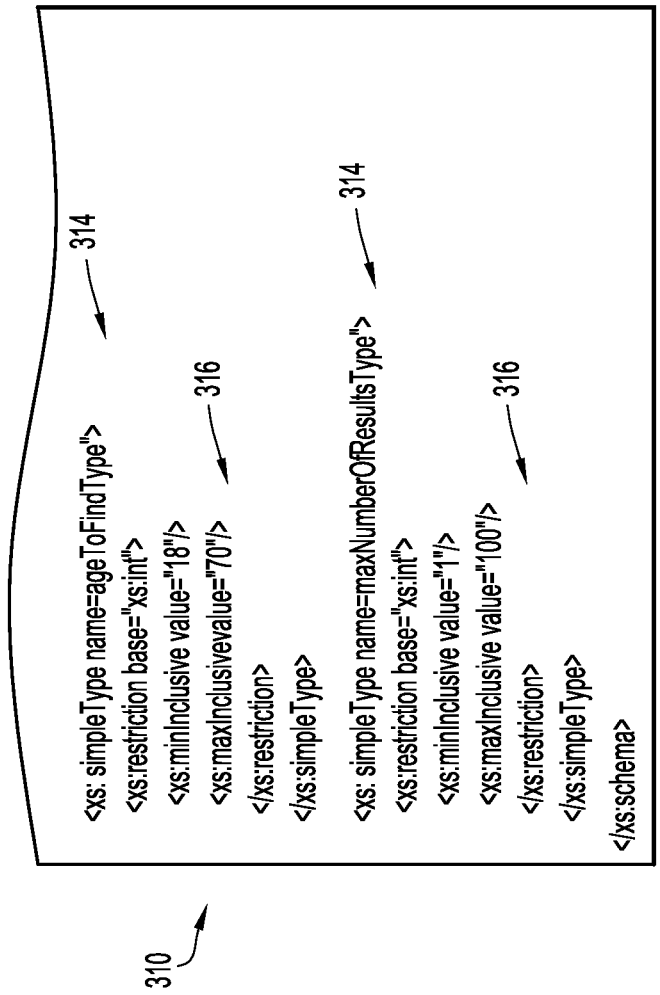

By way of example, FIGS. 3A-3B illustrate an example of a service input schema (e.g., XSD) 310 for a service "customerSearch" that was deduced from an input schema 320 of ETL job metadata. The service performs a person lookup based on provided inputs of first name, last name, and age. Input schema 320 of the ETL job metadata is produced by an ETL application and includes a stage input section 322 and a parameters section 324. Mappings are indicated by the corresponding section for the inputs in input schema 320. For example, firstNameToFind, lastNameToFind, and ageToFind inputs are mapped to and appear in stage input section 322, while a maxNumberOfResults input is mapped to and appears in parameter section 324. In addition, the inputs are associated with corresponding restrictions 323, 325 (e.g., firstNameToFind and lastNameToFind each include a length restriction of 1 to 30 characters for the first and last names of a person as specified in section 322, ageToFind includes a numeric range restriction of 18 to 70 for the age of the person as specified in section 322, and maxNumberOfResults includes a range restriction of 1 to 100 for a maximum number of results as specified in section 324).

Resulting or deduced service input schema (e.g., XSD) 310 includes sections 312, 314, and 316, each designated by a corresponding section label or heading. Section 312 indicates the inputs for the service, while each section 314 is associated with a corresponding input designated in section 312 and includes a section 316 specifying a restriction for that input. In order to generate service input schema 310, sections 322 and 324 of input schema 320 are analyzed to determine and extract the inputs of the service and corresponding restrictions. Service input schema 310 is preferably formed from a template including a skeleton of the resulting schema (e.g., XSD) and fields to receive corresponding information. The extracted information is inserted into the corresponding fields of the template to produce service input schema 310. For example, section 312 indicates the inputs firstNameToFind, lastNameToFind, ageToFind, and maxNumberOfResults from input schema 320. Sections 314 each correspond to one of the inputs and provide a corresponding restriction from input schema 320 in an associated section 316 (e.g., firstNameToFind and lastNameToFind each include a length restriction of 1 to 30 characters for the first and last names of a person as specified in corresponding sections 316, ageToFind includes a numeric range restriction of 18 to 70 for the age of the person as specified in a corresponding section 316, and maxNumberOfResults includes a range restriction of 1 to 100 for a maximum number of results as specified in a corresponding section 316).

Figure 4A:
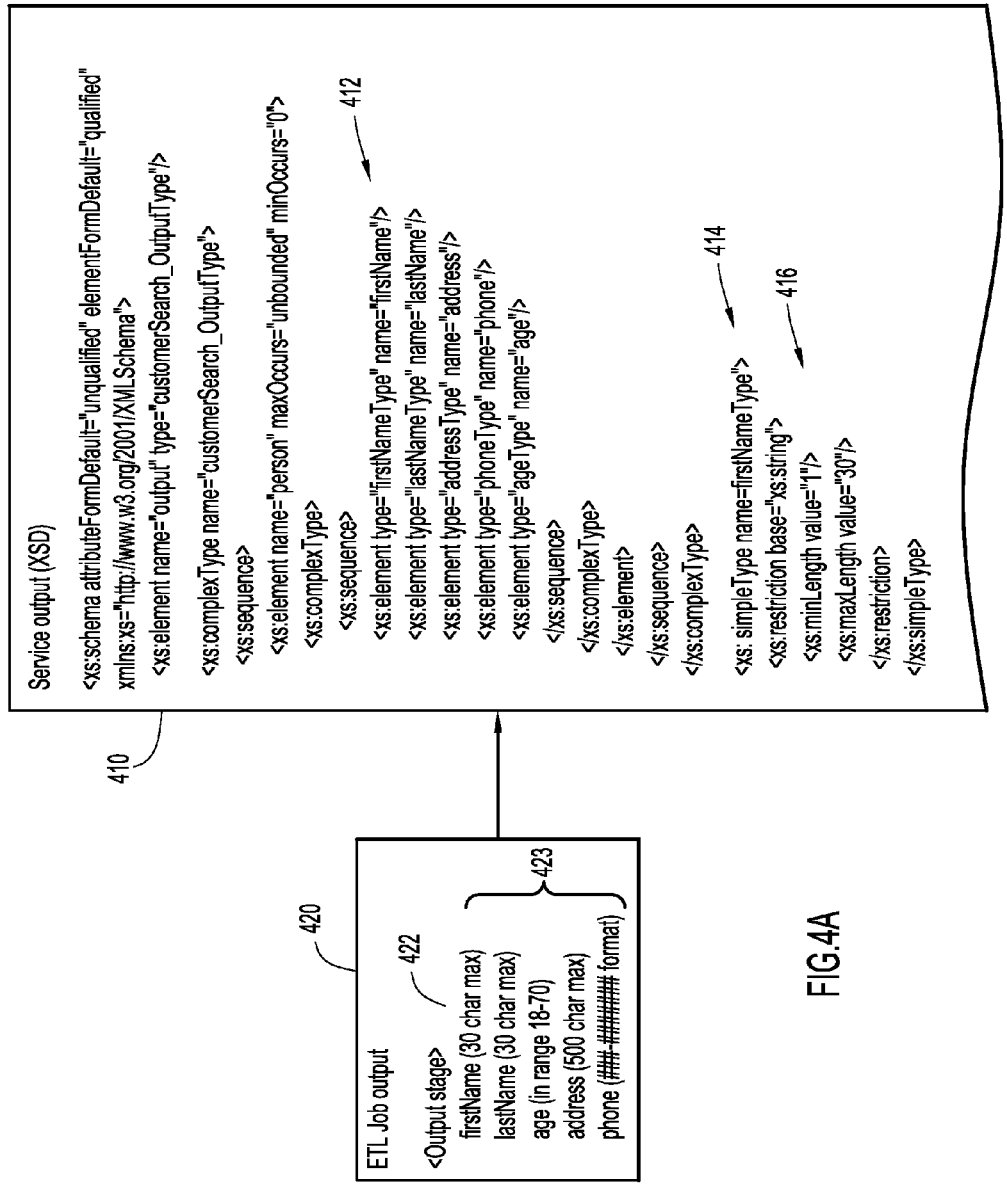
FIGS. 4A-4B are an illustration of an example service output schema generated according to an embodiment of the present invention.
Figure 4B:
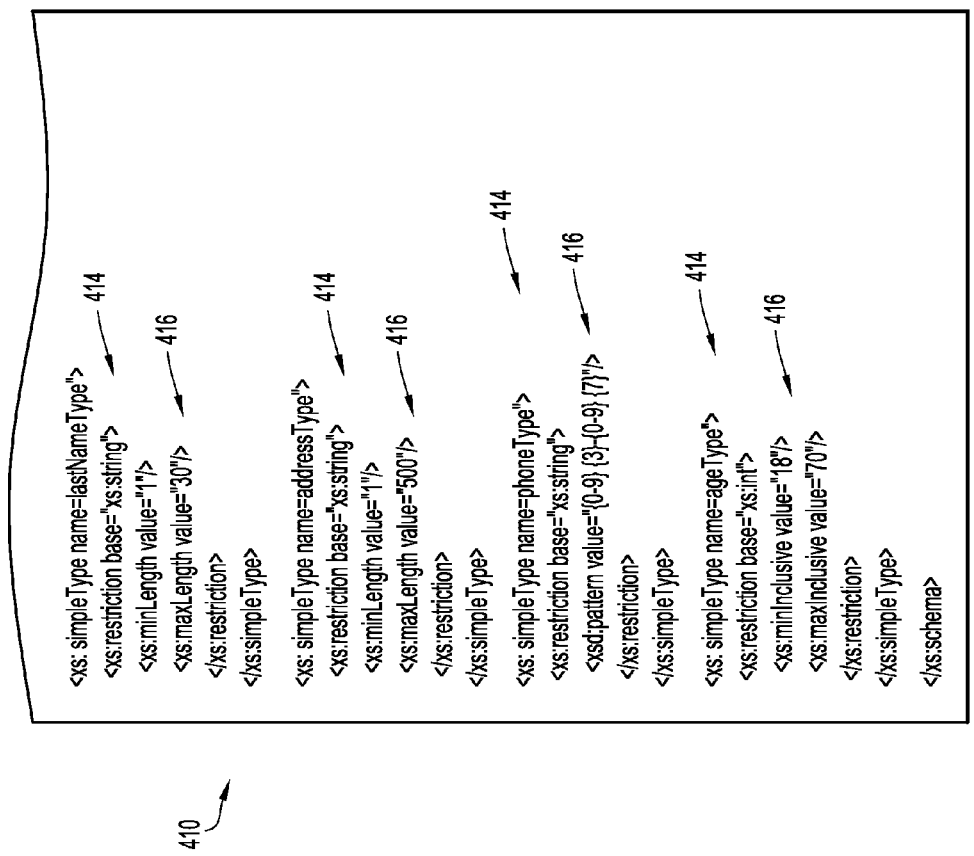

By way of further example, FIGS. 4A-4B illustrate an example service output schema (e.g., XSD) 410 for the service "customerSearch" described above. The service output schema was deduced from an output schema 420 of ETL job metadata. The service performs a person lookup based on provided inputs of first name, last name, and age. Output schema 420 of the ETL job metadata is produced by an ETL application and includes a stage output section 422. The outputs are placed in output stage section 422 (e.g., the firstName, lastName, address, phone and age outputs are placed in stage output section 422). In addition, the outputs are associated with corresponding restrictions 423 (e.g., firstName and lastName each include a length restriction of 1 to 30 characters for the first and last names of a person as specified in section 422, address includes a length restriction of 1 to 500 characters for the address of the person as specified in section 422, phone includes a pattern restriction for the telephone number of the person as specified in section 422, and age includes a numeric range restriction of 18 to 70 for the age of the person as specified in section 422).

Resulting or deduced service output schema 410 includes sections 412, 414, and 416, each designated by a corresponding section label or heading. Section 412 indicates the outputs for the service, while each section 414 is associated with a corresponding output designated in section 412 and includes a section 416 specifying a restriction for that output. In order to generate service output schema 410, section 422 of output schema 420 is analyzed to determine and extract the outputs of the service and corresponding restrictions. Service output schema 410 is preferably formed from a template including a skeleton of the resulting schema (e.g., XSD) and fields to receive corresponding information. The extracted information is inserted into the corresponding fields of the template to produce output service schema 410. For example, section 412 indicates the outputs firstName, lastName, address, phone, and age. Sections 414 each correspond to one of the outputs and provide a corresponding restriction in an associated section 416 (e.g., firstName and lastName each include a length restriction of 1 to 30 characters for the first and last names of a person as specified in corresponding sections 416, address includes a length restriction of 1 to 500 characters for the address of the person as specified in a corresponding section 416, phone includes a pattern restriction for the telephone number of the person as specified in a corresponding section 416, and age includes a numeric range restriction of 18 to 70 for the age of the person as specified in a corresponding section 416).

Once the schemas for the service inputs and outputs are generated, the metadata for the ETL job is utilized to produce an application description (e.g., Web Application Descriptor Language (WADL)) at step 205 (FIG. 2). The application description is preferably stored in a file for further utilization as described below. The application description refers to schemas 310, 410 for the service inputs and outputs described above in order to use the schema information for the service inputs and outputs.

By way of example, FIG. 5 illustrates an example application description 500 (e.g., WADL) for the service "customerSearch" described above that performs a person lookup based on provided inputs of first name, last name, and age. Application description 500 includes sections 510 and 520. Section 510 references the generated schemas for the inputs and outputs of the service (e.g., indicates the name of the file containing these schemas (e.g., within an include statement)). Section 520 indicates one or more methods (or procedures) for the service (e.g., a GET method as viewed in FIG. 5), and provides specifications for the input parameters and resulting outputs of the methods (e.g., in accordance with schemas 310, 410 described above).

Application description 500 is preferably formed from a template including a skeleton of the resulting application description (e.g., WADL) with fields to receive corresponding information. In order to generate application description 500, schemas 310, 410 and metadata of the ETL job are analyzed to determine and extract the information for the fields. The extracted information is inserted into the corresponding fields of the template to produce application description 500. By way of example, the statement, 'type="firstNameToFindType"', of section 520 of the application description refers or corresponds to the construct, '<xs:simpleType name="firstNameToFindType">', of a section 314 of input service schema 310. Further, the statement for the output, 'representation . . . element="customerSearch_OutputType"/>', refers or corresponds to the construct, '<xs:complexType name="customerSearch_OutputType">', including sections 412, 414, and 416 of output schema 410.

The schemas (e.g., XSD) for the service inputs and outputs and the application description (e.g., WADL) for the service may be generated by any custom and/or conventional tools.

Referring back to FIG. 2, a test case can alternatively be generated and executed against an external or third party service by any client of that service. In this case, a server system providing the external service is queried (e.g., by test generation module 16) for the schemas (e.g., XSD) of the service inputs and outputs and the application description (e.g., WADL) at step 210 (FIG. 2). This may be accomplished via an HTTP OPTIONS call to the external or third party service. The application description describes the service interfaces, includes a reference to the schemas for the service inputs and outputs (e.g., indicates a file containing these schemas), and is preferably stored in a file for further utilization as described below. The server system may produce the schemas and application description via any conventional or other tools.

Once the schemas for the service inputs and outputs and the application description have been generated (for an internal service) or retrieved (for an external service) at respective steps 205, 210, the application description and schemas for the service inputs and outputs are processed to generate test cases for the ETL job. The test cases may be in the form of a test script for use in HTTP automation products (e.g., IBM Rational Functional Tester (RFT), Selenium, etc.), or a Java JUnit application (e.g., which may use HTTP client libraries, such as those from APACHE, or higher-level REST client libraries). The generation of a JUnit application for a test case is typically for one test class per WADL resource. For example, a JUnit test class generated for a customers resource may be class "CustomersResourceTest" as follows:

```
import junit.framework:TestCase;
...
public class CustomersResourceTest extends TestCase {
...
}
```

Test cases are generated using the information for each method (or procedure) in the application description (e.g., WADL). The schemas (e.g., service input and output schemas 310, 410) aid in determining the validation needed for the input parameters and/or outputs of each method. Predefined test case templates are generated for various conditions (or restrictions) in the schemas and are utilized to produce the test cases. The templates typically assign testing data to the input parameters and send a request with that testing data to the method in order to perform a test of the inputs and/or outputs. The results of the test are based on a response from the method to the test data. The input parameters may be set with data that comply with or violate the corresponding input and/or output restrictions specified in the schemas.

In particular, the application description is analyzed to identify an entry (e.g., a URL and HTTP process or method) at step 215. The corresponding schemas for the service inputs and outputs for the identified entry are retrieved at step 220. The schemas are analyzed to identify conditions or restrictions for input parameters and outputs of the identified entry, where the conditions indicate the test cases to be generated. For example, a present invention embodiment may be configured to generate a string length test case at step 225 (e.g., when a string length restriction for an input parameter or output of the identified entry is present) and a numeric range test case at step 230 (e.g., when a numeric range restriction for an input parameter or output of the identified entry is present) in accordance with the conditions or restrictions specified in the application description and schemas. Further, a parameter test may optionally be generated to test for missing input parameters of the method at step 235. In addition, a configurable test may be generated at step 240 that receives sample test data to provide correct (or incorrect) input for a test case. However, present invention embodiments may generate test cases for any desired inputs and/or outputs, and for any corresponding conditions or restrictions (e.g., value ranges, quantity of input parameters and/or outputs, lengths, values, formats, etc.).

In order to generate the various test cases, the application description and schemas are analyzed to extract relevant information and determine the particular test case needed for an entry (e.g., method or procedure) based on the specified conditions or restrictions (e.g., string length, numeric range, etc.). The pre-defined template for the determined test case is retrieved and the extracted information is inserted into corresponding fields of the template to generate the test case. The test case templates are preferably configured with data that violates the corresponding condition or restriction. For example, a string length test case generated at step 225 may be configured to set the input parameters with data having a character length for the first name parameter in excess of the restricted length of 30, while a numeric range test case generated at step 225 may be configured to set the input parameters with the age parameter having a value outside of the prescribed range. A parameter test case generated at step 235 may be configured to omit one or more input parameters. However, the test cases may be configured with any data that complies with or violates the corresponding restrictions for inputs and/or outputs.

By way of example, application description 500 (FIG. 5) provides a GET method with four input parameters (e.g., firstNameToFind, lastNameToFind, ageToFind, and maxNumberOfResults) and five outputs (e.g., firstName, lastName, age, address, and phone) each corresponding to a type in the schemas (e.g., XSD) 310, 410 for the service inputs and outputs. With respect to an input parameter firstNameToFind with type firstNameToFindType, the schemas identify the base type to be string with a maximum length of 30 characters. This condition or restriction indicates that a string length test case may be generated for this input parameter at step 225. The lastNameToFind input parameter and lastName and address outputs are similarly designated to have a string length restriction, and string length test cases may further be generated for these at step 225. The ageToFind and maxNumberOfResults input parameters and age output each include a numeric range restriction, where numeric range test cases for these may be generated at step 230. The parameter test case may be generated at step 235 and applied to the method to validate method or procedure calls. Moreover, a configurable test may be generated at step 240 that receives sample test data for testing the method.

The test cases may be generated in various formats (e.g., JUnit, Rational Functional Tester, Selenium, etc.). In particular, the desired format of the test case is determined at step 245 (FIG. 2). This may be accomplished by examining a user-configurable or pre-set parameter, or be based on information entered by a user. If the test cases are to be in a JUnit format (e.g., FIGS. 6 and 7) as determined at step 245, the generated test cases are stored as JUnit test cases (or applications) at step 250. Otherwise, the test cases are stored in other formats (e.g., Rational Functional Tester, Selenium, etc.) at step 255.

The test case templates may be pre-configured for the various formats. For example, the test case templates may include templates specifically configured for JUnit test cases or other formats. In this case, the appropriate format specific test case templates are retrieved and utilized to generate the test cases for the desired format (e.g., at steps 225, 230, 235, and 240 described above).

Alternatively, the test case templates may correspond to a plurality of different formats (e.g., include specifics of two or more formats within the template). These test case templates may be utilized to generate test cases, where the test cases are subsequently edited or modified automatically (e.g., at steps 250, 255) to produce test cases of the desired format. By way of example with respect to a JUnit format, a test case generated from a test case template with a plurality of formats may be edited to maintain portions associated with the JUnit format and remove portions pertaining to other formats.

The above process is repeated for additional entries (e.g., methods or procedures) in the application description commencing from step 215. When each entry has been processed as determined at step 260, and the test case generation terminates at step 265.

By way of example, various example test cases for the method (e.g., GET method) of application description 500 (FIG. 5) in the form of JUnit test cases (e.g., using an IBM REST client library) are illustrated in FIGS. 6 and 7. In particular, the test cases include a string length test case 610 ("String type exceeds max length" as viewed in FIG. 6), a numeric range test case 620 ("Numeric type out of range" as viewed in FIG. 6), and a parameter test case 630 ("Missing required parameter" as viewed in FIG. 6). For example, string length test case 610 may be generated at step 225 (FIG. 2) and is configured to set the input parameters with data 615 having a character length for a first name parameter (e.g., firstNameToFind) in excess of the restricted length of 30. Numeric range test case 620 may be generated at step 230 and is configured to set the input parameters with the age parameter (e.g., ageToFind) having a value 625 outside of the prescribed range. Parameter test case 630 may be generated at step 235 and is configured to omit one or more input parameters of the method (e.g., specifying only two input parameters 635 (e.g., firstNameToFind and lastNameToFind) of the four input parameters (e.g., firstNameToFind, lastNameToFind, ageToFind, and maxNumberOfResults)).

However, the test cases may be configured with any data that complies with or violates the corresponding restrictions for inputs and/or outputs. The data for the test cases may be pre-configured into the test case templates and/or dynamically generated based on the application description, schemas, and/or corresponding restrictions.

In addition, sample test data may be supplied to provide correct (or incorrect) input for a generated test case. Referring to FIG. 7, a test case 710 may be initially generated from a test case template by providing extracted information from the schemas and application description as described above. The test case template includes additional fields (e.g., indicated by a<TODO> tag 715) for receiving the test case input. By way of example, the input parameters receiving test case input include first name, last name, and age (e.g., firstNameToFind, lastNameToFind, and ageToFind) for testing the method (e.g., GET method) of application description 500 (FIG. 5) with the supplied data. Input 725 pertaining to these input parameters (e.g., "John Smith" with an age of 27) is provided (e.g., via user or other input) to generate resulting test case 720 to test the method with this particular data. This type of test may be generated at step 240 (FIG. 2).

Once the test cases are generated, the test cases may be executed to test the ETL job. With respect to an internal service, the test cases can be executed as part of an existing industry test automation tool (e.g., Selenium, etc.). In the event of an external or third party service, the test cases (e.g., JUnit application) are compiled and the service is tested as part of a JUnit test execution (e.g., manually or via any script).

Accordingly, instead of either a complete lack of test cases or late creation of test cases within development, present invention embodiments enable test cases to be automatically generated (e.g., for a developer), thereby reducing the test case creation burden. Further, these test cases may be used to identify to a client regressions or changes in the behavior of a server system from which the client depends. This can reduce the time to properly identify a culprit when a regression caused unexpected behavior in the client. Present invention embodiments enable changes to be identified in a more proactive manner.

It will be appreciated that the embodiments described above and illustrated in the drawings represent only a few of the many ways of implementing embodiments for automatic test case generation.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, test generation module, etc.). These systems may include any types of monitors and input devices (e.g., keyboard, mouse, voice recognition, etc.) to enter and/or view information.

It is to be understood that the software (e.g. test generation module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., test generation module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., schemas, application description, templates, generated test cases, etc.). The database system may be implemented by any number of any conventional or other databases, data stores or storage structures (e.g., files, databases, data structures, data or other repositories, etc.) to store information (e.g., schemas, application description, templates, generated test cases, etc.). The database system may be included within or coupled to the server and/or client systems. The database systems and/or storage structures may be remote from or local to the computer or other processing systems, and may store any desired data (e.g., schemas, application description, templates, generated test cases, etc.).

The schemas for the service inputs and outputs may be of any quantity, format, description or definition language, have any desired structure or organization, may include any desired information (e.g., inputs, outputs, restrictions, formats, etc.), and may be deduced from any information (e.g., service/job metadata, mappings of job/service, schema data, etc.). The metadata, mappings, and schema data may include any service/job metadata (e.g., for processes, objects, properties, mappings, inputs/outputs, etc.). The application description may be of any quantity, format, and description or definition language, may have any desired structure or organization, and may include any desired information (e.g., inputs/outputs, restrictions, formats, methods, any objects, etc.). The template for the schemas and application description may have any desired structure or organization, and may include or receive any desired information. The schemas and application description may be generated, or retrieved from a server or other system, for any type of service (e.g., internal or external).

The test cases may be of any quantity, and be provided in any suitable format for any desired environment (e.g., JUnit, Rational Functional Tester, Selenium, etc.). The test cases may be generated for any desired elements or objects (e.g., inputs or outputs (of methods, procedures, functions, interfaces, etc.), variables, memory or address locations, pointers, data structures, etc.)), and test any desired conditions, restrictions or characteristics (e.g., numeric or other ranges, lengths, formats, specific values, quantity of inputs and/or outputs, etc.). The test cases may be configured to provide data complying with or violating the restrictions, conditions or characteristics of the elements or objects.

The templates for the test cases may have any desired structure or organization, and may include or receive any desired information. The templates may be format specific, or include portions from a plurality of different formats. The data for the test cases may be pre-configured, provided by a user or other system or device, and/or be dynamically generated based on the schemas, application description and/or restrictions, conditions or characteristics of the objects or elements.

The present invention embodiments may employ any number of any type of user interface (e.g., Graphical User Interface (GUI), command-line, prompt, etc.) for obtaining or providing information (e.g., resulting test case formats, generated test cases, jobs, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., generated test cases, job information, schemas, application description, etc.).

The present invention embodiments are not limited to the specific tasks or algorithms described above, but may be utilized for automatic generation of test cases for any service (e.g., internal, external, any type of service, etc.) of a server or other system, or for any interoperability of software components of different systems (e.g., physical or virtual systems, software systems, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of generating one or more test cases for a service of a server system comprising:
    analyzing, by the server system, metadata associated with the service to automatically generate, by the server system, a schema definition for inputs and outputs of the service, the metadata including an input schema of Extract, Transform, Load (ETL) job metadata produced by a first Extract, Transform, Load (ETL) application and an output schema of Extract, Transform, Load (ETL) job metadata produced by a second Extract, Transform, Load (ETL) application;
    generating a description of the service in an application description language that refers to the schema definition; and
    processing the generated description of the service to produce the one or more test cases for the service, wherein processing the generated description comprises:
        identifying a process from among a plurality of processes of the service within the generated description, wherein a data restriction specifies acceptable data for an input parameter and an output of the process; and
        generating one or more test cases for the process based on the data restriction to determine compliance of the process with the data restriction, the one or more test cases including a test case for at least one test selected from a group of tests consisting of a string length test and a numeric range test, wherein:
    the string length test is configured to set a character string input parameter with data having a character length in excess of a restricted length, and
    the numeric range test is configured to set a numeric input parameter with a value outside of a prescribed range.

2. The computer-implemented method of claim 1, wherein the service includes an Extract, Transform, Load (ETL) job.

3. The computer-implemented method of claim 1, wherein the schema definition includes an Extensible Markup Language Schema Definition (XSD) grammar, and the application description language includes Web Application Descriptor Language (WADL).

4. The computer-implemented method of claim 1, wherein the one or more test cases for the service include at least one of a test script and a Java application.

5. The computer-implemented method of claim 1, wherein the service is of a third party server system, and the one or more test cases for the service are produced by one or more clients of the service.

6. The computer-implemented method of claim 1, wherein the one or more test cases for the process include a test case omitting one or more input parameters for the process.

* * * * *